US012792424B2

(12) United States Patent
Bihani et al.

(10) Patent No.: US 12,792,424 B2
(45) Date of Patent: Nov. 10, 2026

(54) SYSTEM AND METHOD FOR RECOMMENDING AN OPTIMAL VIRTUAL MACHINE (VM) INSTANCE

(71) Applicant: Tata Consultancy Services Limited, Mumbai (IN)

(72) Inventors: Ayush Bihani, Kolkata (IN); Amit Kalele, Pune (IN); Nitendra Singh Panwar, Bangalore (IN); Ravindran Subbiah, Thiruvananthapuram (IN)

(73) Assignee: Tata Consultancy Services Limited, Mumbai (IN)

( * ) Notice: Subject to any disclaimer, the term of this patent is extended or adjusted under 35 U.S.C. 154(b) by 573 days.

(21) Appl. No.: 18/342,166

(22) Filed: Jun. 27, 2023

(65) Prior Publication Data

US 2024/0012694 A1 Jan. 11, 2024

(30) Foreign Application Priority Data

Jul. 6, 2022 (IN) ............................. 202221038928

(51) Int. Cl.
*G06F 9/50* (2006.01)
*G06F 9/455* (2018.01)

(52) U.S. Cl.
CPC ........ *G06F 9/5094* (2013.01); *G06F 9/45558* (2013.01); *G06F 9/5072* (2013.01); (Continued)

(58) Field of Classification Search
CPC .. G06F 9/5094; G06F 9/45558; G06F 9/5072; G06F 2009/45562; G06F 2209/501
See application file for complete search history.

(56) References Cited

U.S. PATENT DOCUMENTS

2014/0229934 A1* 8/2014 Larkin .................... G06F 9/452 718/1
2017/0090970 A1* 3/2017 Baskaran ................ H04L 67/10
(Continued)

FOREIGN PATENT DOCUMENTS

CN 112052071 A 12/2020

OTHER PUBLICATIONS

Bhattacharjee et al., "Barista: Efficient and Scalable Serverless Serving System for Deep Learning Prediction Services," (2019).
(Continued)

*Primary Examiner* — April Y Blair
(74) *Attorney, Agent, or Firm* — Finnegan, Henderson, Farabow, Garrett & Dunner, LLP

(57) ABSTRACT

This disclosure relates generally to recommending an optimal VM instance. The increased use of Deep Learning (DL) models in several domains has resulted in an increased demand for hardware configurations to enable heavy computations and faster performance to support the DL techniques. However, the identification of the optimal hardware configuration for the DL requirement is challenging and requires a considerable amount of time and expertise, considering the highly configurable model configuration of DL techniques. The disclosed optimal selection of VM comprises several techniques including benchmarking, using benchmarked results for building an approximation function and use a Bayesian Optimizer (BO) technique to iterate through the search space and generate recommendations of VM configurations, that effectively address the challenges arising due to the dynamic nature of cloud services—pricing and hardware configuration, large number of VM available across regions and cloud service providers and estimating for different types of training code.

13 Claims, 4 Drawing Sheets

(52) U.S. Cl.
CPC .............. *G06F 2009/45562* (2013.01); *G06F 2209/501* (2013.01)

(56) References Cited

U.S. PATENT DOCUMENTS

| | | | | |
|---|---|---|---|---|
| 2019/0245757 | A1* | 8/2019 | Meyer | G06F 9/45558 |
| 2021/0072866 | A1* | 3/2021 | Srail | B60K 35/29 |
| 2021/0367862 | A1* | 11/2021 | Jain | H04L 41/0897 |

OTHER PUBLICATIONS

Khan et al., "ROBOTune: High-Dimensional Configuration Tuning for Cluster-Based Data Analytics," (2021).
Li et al., "Automating Cloud Development for Deep Learning Inference of Real-time Online Services," (2020).

* cited by examiner

300

SYSTEM AND METHOD FOR RECOMMENDING AN OPTIMAL VIRTUAL MACHINE (VM) INSTANCE

PRIORITY CLAIM

This U.S. patent application claims priority under 35 U.S.C. § 119 to: India Application No. 202221038928, filed on Jul. 6, 2022. The entire contents of the aforementioned application are incorporated herein by reference.

TECHNICAL FIELD

The disclosure herein generally relates to usage of Virtual Machines (VM) for deep learning and, more particularly, to recommending an optimal VM instance.

BACKGROUND

Increased use of Deep Learning (DL) models in several computing domains (such as speech recognition, optimization, computer vision and natural language procession) has resulted in an increased demand for hardware configurations that can enable heavy computations and faster performance to support the DL techniques. The requirement of hardware configurations is addressed by the cloud resources. Cloud resources offer customized hardware configurations (Virtual Machines) for faster performance, easy maintenance, quick scaling, reduced cost and savings in time. The cloud resources are rented for training and experimentation purposes, mostly at spot prices or on-demand hourly rates.

Identification of an optimal hardware configuration for the DL requirement has a direct impact on quality and performance at runtime. However, considering the highly configurable model configuration of DL techniques, search for optimal hardware configuration or training of complex architecture in a cloud resource for a specific DL requirement requires a considerable amount of time.

The existing techniques for selection of optimal VM hardware configuration are mostly manual and inefficient. Several other state-of-art solutions are static and not real-time as they do not adapt to changing hardware configurations across cloud service providers. Also, factors such as large configuration space of DL models having different architectures and complex abstractions in execution of deep learning libraries on hardware makes it challenging to predict the model's runtime performance, thereby making it difficult, costly and time-consuming to properly understand the factors affecting the runtime performance and model them under the fast-changing landscape of DL models and libraries. Further, existing solutions focus on providing a set of best practices to minimize costs or checking resource utilization to come up with a combination of on-demand, reserved and spot instances. However, for DL models, model metrics like training time, error metrics are not taken into consideration by any of the existing solutions. Also, calculation of carbon emissions generated is a challenging task that is not considered in existing state-of-art techniques as carbon emissions varies with the data center efficiency and the method of producing the electricity being supplied to the datacenters varies greatly across geography and time. Therefore, there is a need for creating a more robust, efficient and real-time mechanism that does not requires the need of human expert, while also considering carbon emissions.

SUMMARY

Embodiments of the present disclosure present technological improvements as solutions to one or more of the above-mentioned technical problems recognized by the inventors in conventional systems. For example, in one embodiment, a method for recommending an optimal VM instance is provided.

The system is configured to receive a plurality of inputs associated with an artificial intelligence (AI) technique, via one or more hardware processors, wherein the plurality of inputs comprises a training code (T), a plurality of dataset (D) of the training code, plurality of historic data, a plurality of cloud infrastructure data, a parameter space associated with the plurality of cloud infrastructure data, a user requirement, a pre-defined threshold accuracy parameter and a cost function. The system is further configured to generate a Virtual Machine (VM) knowledge store, via the one or more hardware processors, using the plurality of historic data based on a mathematical modelling technique. The system is further configured to identify a basic set of VMs for the training code (T) and the plurality of dataset (D), via the one or more hardware processors, using the VM knowledge store. The system is further configured to update, via the one or more hardware processors, the VM knowledge store for the training code (T) and the plurality of dataset (D) based on the basic set of VMs and the user requirement, wherein the updating of the VM knowledge store comprises: identifying a first set of VMs for the training code (T) and the plurality of dataset (D), using the plurality of historic data, the parameter space and the plurality of cloud VM data based on a clustering technique; benchmarking the training code (T) and the plurality of dataset (D) on the first set of VMs to obtain a benchmarked metrics using the plurality of inputs, based on a benchmarking technique; mapping the benchmarked metrics and the parameter space to obtain an approximate function, based on the pre-defined threshold accuracy parameter using a mapping technique; generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

In another aspect, a method for recommending an optimal VM instance is provided. The method includes receiving a plurality of inputs associated with an artificial intelligence (AI) technique, wherein the plurality of inputs comprises a training code (T), a plurality of dataset (D) of the training code, plurality of historic data, a plurality of cloud infrastructure data, a parameter space associated with the plurality of cloud infrastructure data, a user requirement, a pre-defined threshold accuracy parameter and a cost function. The method further includes generating a Virtual Machine (VM) knowledge store, via the one or more hardware processors, using the plurality of historic data based on a mathematical modelling technique. The method further includes identification of a basic set of VMs for the training code (T) and the plurality of dataset (D), using the VM knowledge store. The method further includes updating the VM knowledge store for the training code (T) and the plurality of dataset (D) based on the basic set of VMs and the user requirement, wherein the updating of the VM knowledge store comprises: identifying a first set of VMs for the training code (T) and the plurality of dataset (D), using the plurality of historic data, the parameter space and the plurality of cloud VM data based on a clustering technique; benchmarking the training code (T) and the plurality of dataset (D) on the first set of VMs to obtain a benchmarked metrics using the plurality of inputs, based on a benchmarking technique; mapping the benchmarked metrics and the parameter space to obtain an approximate function, based on the pre-defined threshold accuracy parameter using a mapping technique; generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

In yet another aspect, a non-transitory computer readable medium for recommending an optimal VM instance is provided. The method includes receiving a plurality of inputs associated with an artificial intelligence (AI) technique, wherein the plurality of inputs comprises a training code (T), a plurality of dataset (D) of the training code, plurality of historic data, a plurality of cloud infrastructure data, a parameter space associated with the plurality of cloud infrastructure data, a user requirement, a pre-defined threshold accuracy parameter and a cost function. The method further includes generating a Virtual Machine (VM) knowledge store, via the one or more hardware processors, using the plurality of historic data based on a mathematical modelling technique. The method further includes identification of a basic set of VMs for the training code (T) and the plurality of dataset (D), using the VM knowledge store. The method further includes updating the VM knowledge store for the training code (T) and the plurality of dataset (D) based on the basic set of VMs and the user requirement, wherein the updating of the VM knowledge store comprises: identifying a first set of VMs for the training code (T) and the plurality of dataset (D), using the plurality of historic data, the parameter space and the plurality of cloud VM data based on a clustering technique; benchmarking the training code (T) and the plurality of dataset (D) on the first set of VMs to obtain a benchmarked metrics using the plurality of inputs, based on a benchmarking technique; mapping the benchmarked metrics and the parameter space to obtain an approximate function, based on the pre-defined threshold accuracy parameter using a mapping technique; generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The requirement of hardware configurations to support DL models is addressed by the cloud resources. The cloud resources offer customized hardware configurations (Virtual Machines) for faster performance, easy maintenance, quick scaling, reduced cost and savings in time. The cloud resources are rented for training and experimentation purposes, mostly at spot prices or on-demand hourly rates. The understanding of resource utilization and training time of the DL models and cloud resources is essential to ensure enhancing resource efficiency, minimizing the environmental impact of consumption of energy, and cost-benefit decision making for DL frameworks in the cloud resources. The existing state-of-art techniques do not support real-time mechanism and requires the need of human expert, while also not considering the ever-changing dynamics of DL models and also not considering DL models model metrics like training time, error metrics nor calculation of carbon emissions.

The disclosure is a combined technique of optimal recommendation of VM based using results of benchmarking for building an approximation function and Bayesian Optimizer technique to iterate through a search space to finally generate recommendations of VM configurations using the approximation function, that effectively address the challenges arising due to the dynamic nature of cloud services—pricing and hardware configuration, large number of VM available across regions and cloud service providers and estimating for different types of training code.

Figure 1:
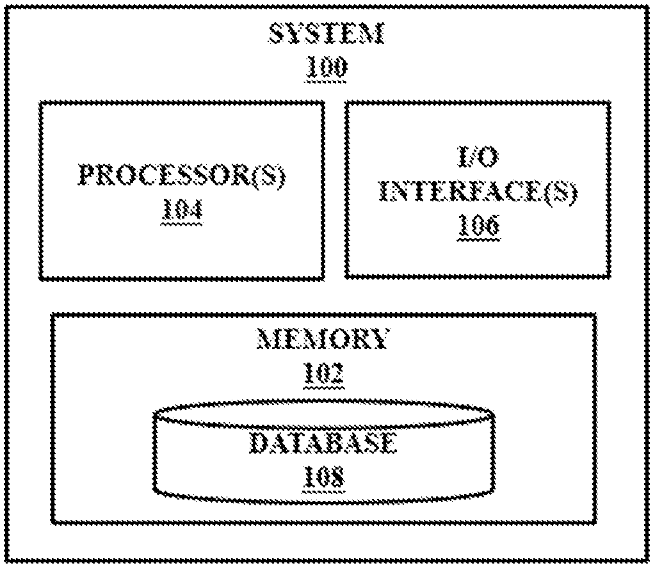
FIG. 1 illustrates an exemplary system recommending an optimal VM instance according to some embodiments of the present disclosure.

Referring now to the drawings, and more particularly to FIG. 1 through_FIG. 3B, where similar reference characters denote corresponding features consistently throughout the figures, there are shown preferred embodiments and these embodiments are described in the context of the following exemplary system and/or method.

FIG. 1 is an exemplary block diagram of a system 100 for recommending an optimal VM instance in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information for recommending an optimal VM instance. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
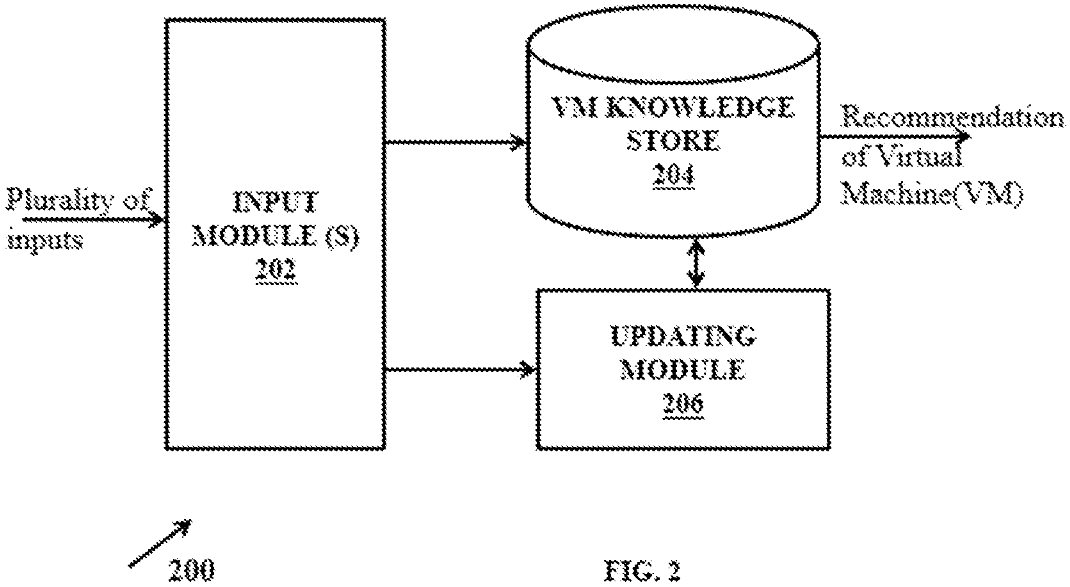
FIG. 2 is a functional block diagram of the system of FIG. 1, for recommending the optimal VM instance, according to some embodiments of the present disclosure.
Figure 3A:
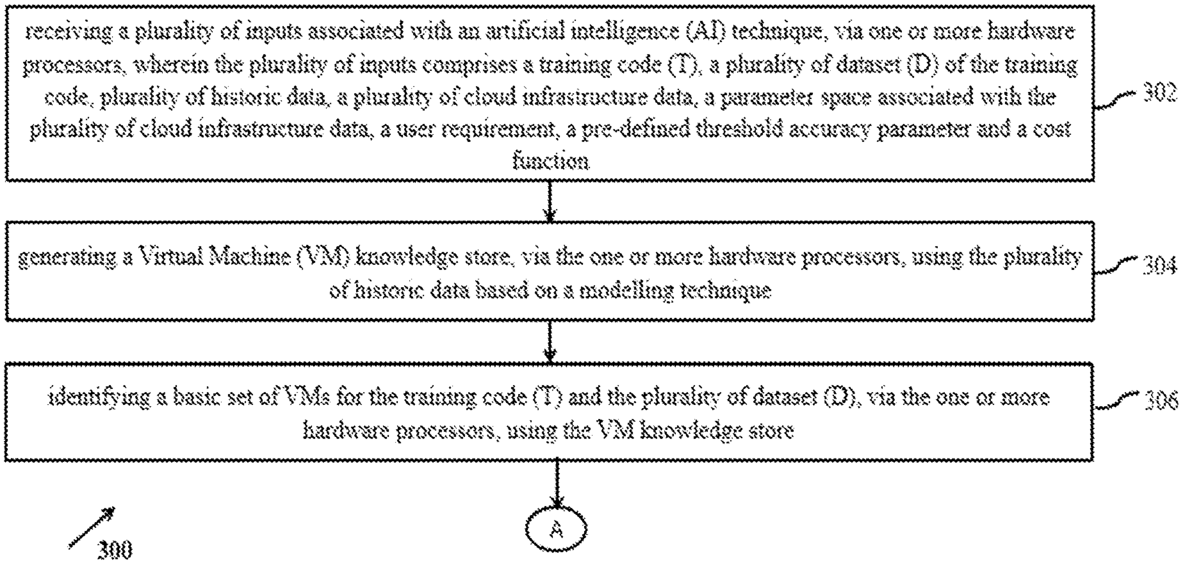
FIG. 3A and FIG. 3B is a flow diagram illustrating a method (300) recommending an optimal VM instance, by the system of FIG. 1, in accordance with some embodiments of the present disclosure.
Figure 3B:
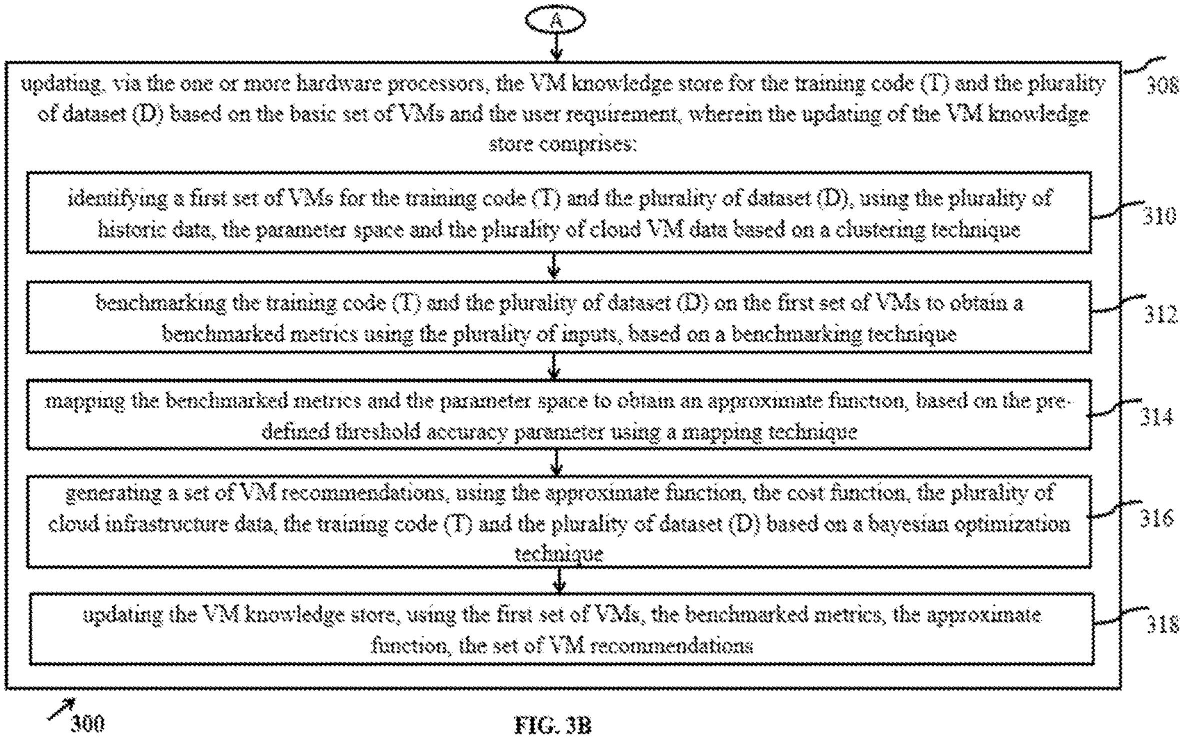

Functions of the components of the system 100 are explained in conjunction with functional block diagram of the system 100 in FIG. 2 and flow diagram of FIG. 3A and FIG. 3B for recommending an optimal VM instance.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes for recommending an optimal VM instance.

As depicted in FIG. 2, the system 200 of system 100 is configured for recommending an optimal VM instance, wherein the modules of system 200 are implemented by the one or more hardware processors 104 of system 100.

The system 200 is configured for receiving a plurality of inputs in an input module 202, wherein the plurality of inputs is associated with an artificial intelligence (AI) technique. The plurality of inputs comprises a training code (T), a plurality of dataset (D) of the training code, plurality of historic data, a plurality of cloud infrastructure data, a parameter space associated with the plurality of cloud infrastructure data, a user requirement, a pre-defined threshold accuracy parameter and a cost function. The system 200 further comprises a VM knowledge store 204, wherein the VM knowledge store is generated using the plurality of historic data based on a mathematical modelling technique. The VM knowledge store 204 is used for recommending a set of VMs for the training code (T) and the plurality of dataset (D). The VM knowledge store 204 is updated based a user requirement using an updating module 206 in the system 200. The updating module 206 in the system 200 is configured for updating the VM knowledge store 204 in several steps including: identifying a first set of VMs, benchmarking the training code (T) and the plurality of dataset (D) on the first set of VMs to obtain a benchmarked metrics using the plurality of inputs, mapping the benchmarked metrics and the parameter space to obtain an approximate function and generating a set of VM recommendations.

The various modules of the system 100 and the functional blocks in FIG. 2 are configured for recommending an optimal VM instance are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3B. The FIGS. 3A-3B with reference to FIG. 1, is an exemplary flow diagram illustrating a method 300 for recommending an optimal VM instance using the system 100 of FIG. 1 according to an embodiment of the present disclosure.

The steps of the method of the present disclosure will now be explained with reference to the components of the system 100 of FIG. 1 for recommending an optimal VM instance and the modules 202-206 as depicted in FIG. 2 and the flow diagrams as depicted in FIGS. 3A-3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs is received at the input module 202. The plurality of inputs are associated with an artificial intelligence (AI) technique. The plurality of inputs comprises a training code (T), a plurality of dataset (D) of the training code, a plurality of historic data, a plurality of cloud infrastructure data, a parameter space associated with the plurality of cloud infrastructure data, a user requirement, a pre-defined threshold accuracy parameter and a cost function.

In an embodiment, the AI technique comprises one of a machine learning technique and a deep learning technique, where the machine learning technique includes a Gradient Boosting Machine, a Random Forest and a XGBoost and the deep learning technique includes one of a plurality of convolution layer, a plurality of recurrent layers, a plurality of feedforward layers, plurality of attention mechanisms.

In an embodiment, the training code (T) and the plurality of dataset (D) of the training code is obtained from a user.

The objective of the disclosed technique is to identify an optimal VM configuration for the T and D.

In an embodiment, the plurality of cloud infrastructure data ($C_{data}$) comprises of information regarding several Virtual Machines (VMs) offering by different cloud providers. The $C_{data}$ also includes information regarding VM's region of availability, pricing and underlying hardware configuration details including ex-aws, instance_name, #vcpus, #cores, #threads, #clock speed, #memory, #cpu_type, etc. and the parameters that define an instance_name is the ~(#vcpus, #cores, #threads, #clock speed, #memory, #cpu_type, etc.

In an embodiment, the parameter space associated with the plurality of cloud infrastructure data, wherein the $C_{data}$ is parameterized by Θ which is equal to $(\theta_1, \theta_2, \theta_3, \ldots \theta_k)$ comprising of different hardware configurations regarding Virtual Machines that consists of Central Processing Unit (CPU) clock speed, memory, Graphical processing Unit (GPU) type, GPU memory, FP16, FP32 etc.

In an embodiment, the user requirement is a user choice on parameters that includes memory, CPU clock speed, number of GPUs etc. The user requirement is assigned it a "userConstraints" parameter.

At step 304 of the method 300, a VM knowledge store 204 is generated. The VM knowledge store 204 is generated using the plurality of historic data based on a mathematical modelling technique.

In an embodiment, the mathematical modelling technique includes generating VM knowledge store 204 using the plurality of cloud infrastructure data ($C_{data}$), along with a plurality of metadata used to collect metadata like number of layers, types of layers, number of parameters etc., from the training code T along with constraints, and stores it in $\Theta_{meta}$. The knowledge store 204 has the model details from previous experiments and their outcomes and uses the training metadata mentioned above to come up with constraints incorporating the best practices recommendations and prior knowledge of experiment outcomes for different model architectures.

At step 306 of the method 300, a basic set of VMs is identified for the training code (T) and the plurality of dataset (D) using the VM knowledge store 204.

In an embodiment, the plurality of cloud infrastructure data ($C_{data}$), along with a plurality of metadata is used for identifying the basic set of VMs for the training code T from the VM knowledge store 204 based on the user requirement using a comparison or a matching technique known-in-art. The basic set of VMs are a first recommendation of VM configurations that can be used to support the applications of the training data (T), wherein based on the user requirement, (a) the basic set of VM s are used for recommendation or (b) the VM knowledge store 204 is updated to identify a set of final recommendation of VMs that meet the user requirement.

At step 308 of the method 300, based on the basic set of VMs and the user requirement, the VM knowledge store 204 is updated using the updating module 206. The VM knowledge store 204 is updated for the training code (T) and the plurality of dataset (D) and the steps for updating of the VM knowledge store 204 is explained in the below sections.

In an embodiment, the basic set of VMs generated using the VM knowledge store 204 is validated for a user's requirement. Based on the validation, if the user requirement is satisfied, the basic set of VMs are recommended, wherein validation is dynamically decided based on the plurality of inputs. However, if the user requirement is not satisfied, then the VM knowledge store 204 is updated for the training code (T) and the plurality of dataset (D) to recommend optimal VM configuration for the T and D. The steps for updating of the VM knowledge store 204 are explained in the below sections of steps 310-318.

At step 310 of the method 300, a first set of VMs is identified for the training code (T) and the plurality of dataset (D). The first set of VMs is identified using the plurality of historic data, a parameter space and the plurality of cloud VM data based on a clustering technique.

In an embodiment, the clustering techniques includes one of a nearest neighbor technique, k-clustering and unsupervised clustering techniques. The clustering techniques includes initializing the VM knowledge store 204 as "KSTORE", wherein KSTORE is initialized as a data base. The terms KSTORE and VM knowledge store 204 are used interchangeable in the disclosure. The K, which is initialized as an empty list is then appended to a plurality of cluster centers generated from a ClusterGen function which takes as input the $C_{data}$ and Θ to calculate the cluster centers based the clustering approach and added it to a list. The clustering technique comprises calculation of a plurality of cluster centers based on a ClusterGen function using the plurality of historic data, a parameter space, and the plurality of cloud infrastructure data Further distance ($K_{dist}$) is computed using a specified distance metric to assign a score to the points in $C_{data}$. Finally, the calculated scores, $K_{dist}$, the metadata, the $\Theta_{meta}$, userConstraints and the original sample space of VM $C_{data}$ is passed on to a vmSample which reduces the search space of VM and generates the sampled VM space or the first set of VMs ($C^*_{data}$), which is represented as shown below:

Initialize: K=[ ]
userConstraints←getUserChoice( )
$\Theta_{meta}$←metaDataGen (T, VMKnowledgeStore)
K. append(ClusterGen($C_{data}$, Θ)
$K_{dist}$←metricDist ($C_{data}$, Θ, K)
$C^*_{data}$←vmReduction ($C_{data}$, $K_{dist}$, $\Theta_{meta}$, userConstraints)

At step 312 of the method 300, the training code (T) and the plurality of dataset (D) is benchmarked on the first set of VMs. The first set of VMs are benchmarked using the plurality of inputs to obtain a benchmarked metrics, based on a benchmarking technique.

The benchmarking technique as known-in-art performs a warm start and the training code run for a plurality of epochs, wherein the plurality of epochs is a number associated with experimental runs. Further the computational metrics including total runtime for all the epochs run is captured and an estimate on time per epoch is estimated based on: (runtime/{number of epochs run for}).

In an embodiment, the training code T is benchmarked on $C^*_{data}$, to obtain the benchmarked metrics. Here a VM (V) is iteratively selected from the $C^*_{data}$ and to start a corresponding VM environment. Then a training time is benchmarked on a corresponding estimator function (trainingEstimator) which stores the data in $\Psi_j$. After benchmarking for all the VMs, the benchmarked metrics is compiled along with other performance metrics and combined to obtain the benchmarked metrics ($\Psi_{combined}$), expressed as shown below:

Initialize: j=0, r=len ($C^*_{data}$)
while j≤r do
{v←$(C^*_{data})_j$
env←startInstance (v)
$\Psi_j$←training Estimator (T, D, v)}
$\Psi_{combined}$←compileTrain (ψ, Θ, $C^*_{data}$)

At the step 314 of the method 300, the benchmarked metrics and the parameter space is mapped to obtain an approximate function. The approximate function is obtained based on the pre-defined threshold accuracy parameter using a mapping technique.

In an embodiment, the mapping technique includes defining a model space and identification of a set of models for the model space iteratively based on the pre-defined threshold accuracy parameter and a model selection function, which is explained in below section.

In an embodiment, a mapping is created between the parameter space of Θ of VM and the benchmarked metrics ($\Psi_{combined}$) A model space Ω is defined that consists for different kinds of model already (Random Forest, Gradient Boosting Machine, Neural Network etc.) defined. Here the objective is to create an approximation Function that accurately creates a mapping between the Θ and $\cdot\cdot_{combined}$. Hence, every model is iteratively checked by fine tuning it till its error goes below a pre-defined threshold accuracy parameter ($\epsilon$) and included to a list of working models ($M_\omega$) if it has error less than the $\epsilon$. After shortlisting all the models, the selected models is saved as modelSelection function which considers all possible stacking, ensemble and blending approaches along with the individual models to create an optimized approximation function with best performance ($\Omega_{opt}$), expressed as shown below:

```
while n < len (Ω) do
{for w in Ω do
{ ω ← modelTrain ( ω, Ψ_combined)
while j < MaxTrails do
    { if ω.error > ϵ then
    { ω ← ω.fineTune ( ) }
     j ← j + 1 }
     if ω.error < ϵ then
       { M_ω.append (ω)}
        n ← n + 1} }
Ω_opt ← modelSelection (M_ω)
```

At step 316 of the method 300, a set of VM recommendations is generated based on a bayesian optimization technique. The set of VM recommendations is generated using approximate function, the cost function, plurality of cloud infrastructure data, the training code (T) and the plurality of dataset (D).

The bayesian optimization technique includes defining a search space, iterating through the search space for a pre-defined number of trials using the approximation function and the cost function to generate the set of VM recommendations.

The cost function includes a time parameter, a cost parameter and a carbon emission parameter. The cost function is a very flexible function that can be chosen dynamically at real time by the user based on the user requirement, wherein the total cost of running the VM is minimized and varies across cloud service providers and across geographies. The calculation of carbon emissions generated is a challenging task as it varies with the data center efficiency and the method of producing the electricity being supplied to the datacenters, as the carbon emissions varies greatly across geography and time. Electricity produced from fossil fuels will have more emissions whereas cleaner sources of energy like Nuclear and Solar will produce lesser emissions.

In an embodiment, the cost-function (costFunc) is used to sample from a bayesian optimization (BO). The search space for the BO is defined using Θ and the $C_{data}$ by passing it onto a funcBO.trialSpace since the search space is utilised to find the optimal VM configuration. Further, an iteration is performed through the trial space for an initialized number of trials, $\eta_{trails}$ For each trial a parameters configuration space is sampled from Θ and data and then passed onto the approximation function, $\Omega_{opt}$, to calculate the $t_{sample}$ for a particular sample configuration.

Further based on a calculated sample, along with the cost function is evaluated to minimize for the loss as a measure of the cost function. Then the calculated loss and sample configuration for the trial is used to update the bayesian optimizer so, it can update its inner prior for selection on next parameter configuration inside the parameter space. This way every configuration of parameter that is being sampled will be done in a way to minimize the corresponding loss with respect to the cost function/objective function. Once all the trials are finished the VM knowledge store 204 is updated with the best parameters for configuration passed onto the BO and then saved in the VM knowledge store 204 along with the recommendations, β, generated based on the best parameters received from the trials.

```
Initialize: η_trails, Cost function
trailSearchSpace←funcBO.trailSpace (Θ, C_data)
while trails<η_trails do
{sampleBO←funcBO.sample (Θ, C_data)
t_sample←Ω_opt.predict (sampleBO)
loss←funcBO.eval (t_sample, sampleBO, cost function)
funcBO.update (loss, sample)}
β←recommendationsBO (funcBO.bestParams, C_data)
VM knowledge store.save (β, funcBO.bestParams)
return β
```

At step 318 of the method 300, the VM knowledge store 204 is updated in the updating module 206. The VM knowledge store 204 is updated using the first set of VMs, the benchmarked metrics, the approximate function, set of VM recommendations.

In an embodiment, the using the first set of VMs, the benchmarked metrics, the approximate function, set of VM recommendations are used to update the VM knowledge store 204 as shown below:

$C^*_{data}$←(T, Θ, $C_{data}$, VM knowledge store)

$\Psi_{combined}$←vmBenchmark (T, D, $C^*_{data}$)

$\Omega_{opt}$←approxFunc ($\Psi_{combined}$, Θ, $\epsilon$, maxTrials)

β←recGen ($C_{data}$, Θ, $\Omega_{opt}$)

The VM knowledge store is used for recommending a final set of VMs using the first set of VMs, the benchmarked metrics, the approximate function, set of VM recommendations.

Experiments:

The performance of the disclosed techniques is tested by recommendations made for US-West (Oregon) location datacenter. For experimentation purposes with Modified National Institute of Standards and Technology (MNIST) training code benchmarking the MNIST training code on the sample of VM generated. Further the benchmarking is performed in an automated manner, and further the approximation function is constructed which comprised of an ensemble of GradientBoosting Regressor and DecisionTree algorithm which had MAPE of 13.12%. Further the approximation function and BO is used to iterate through the parameters to generate the recommendations.

The recommendations are made for optimizing time (p3.2×large), optimizing the cost (t3a.medium) and optimizing the co2 emissions (gdn.2×large).

Results are tabulated below:

TABLE 1

Results of recommending an optimal VM instance

| Instance Name | Total cost (in dollars) | Predicted time for 1000 epochs (in hours) | Total co2 emission (gram-equivalent CO2) | Recommendation |
|---|---|---|---|---|
| p3.2xlarge | $1.56 | 0.510752 | 44.651568 | Time Optimized |
| t3a.medium | $0.193701 | 5.151629 | 113.580632 | Cost Optimized |
| g4dn.2xlarge | $0.515078 | 0.684945 | 40.832386 | CO2 Emission Optimized |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to recommending an optimal VM instance. The increased use of Deep Learning (DL) models in several domains has resulted in an increased demand for hardware configurations to enable heavy computations and faster performance to support the DL techniques. However, the identification of the optimal hardware configuration for the DL requirement is challenging and requires a considerable amount of time and expertise, considering the highly configurable model configuration of DL techniques. The disclosed optimal selection of VM comprises several techniques including benchmarking, using benchmarked results for building an approximation function and use a Bayesian Optimizer (BO) technique to iterate through the search space and generate recommendations of VM configurations, that effectively address the challenges arising due to the dynamic nature of cloud services—pricing and hardware configuration, large number of VM available across regions and cloud service providers and estimating for different types of training code.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for recommending an optimal virtual machine (VM) instance, comprising:

receiving a plurality of inputs associated with an artificial intelligence (AI) technique, via one or more hardware processors, wherein the plurality of inputs comprises a training code (T), a plurality of dataset (D) of the training code, plurality of historic data, a plurality of cloud infrastructure data ($C_{data}$), a parameter space associated with the plurality of cloud infrastructure data ($C_{data}$), a user requirement, a pre-defined threshold accuracy parameter and a cost function, wherein the parameter space associated with the plurality of cloud infrastructure data comprising of hardware configurations regarding virtual machines (VM), comprising a memory, a central processing unit (CPU) clock speed, and number of graphics processing unit (GPUs), wherein the cost function includes a time parameter, a cost parameter and a carbon emission parameter;

generating a Virtual Machine (VM) knowledge store, via the one or more hardware processors, using the plurality of historic data based on a mathematical modelling technique;

identifying a basic set of VMs for the training code (T) and the plurality of dataset (D), via the one or more hardware processors, using the VM knowledge store; and updating, via the one or more hardware processors, the VM knowledge store for the training code (T) and the plurality of dataset (D) based on the basic set of VMs and the user requirement, wherein the updating of the VM knowledge store comprises:

identifying a first set of VMs for the training code (T) and the plurality of dataset (D), using the plurality of historic data, the parameter space and the plurality of cloud VM data based on a clustering technique;

benchmarking the training code (T) and the plurality of dataset (D) on the first set of VMs to obtain a benchmarked metrics using the plurality of inputs, based on a benchmarking technique;

mapping the benchmarked metrics and the parameter space to obtain an approximate function, based on the pre-defined threshold accuracy parameter using a mapping technique;

fine tuning a set of models until an error value is below a pre-defined threshold accuracy parameter ($\epsilon$);

including the set of models to a list of working models ($M_\omega$) when the error value of a model, among the set of models is below the pre-defined threshold accuracy parameter ($\epsilon$), wherein the list of working models is saved as a modelSelection function considering stacking, ensemble and blending approaches and creating an optimized approximation function with performance ($\Omega_{opt}$);

generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

2. The processor implemented method of claim 1, wherein the VM knowledge store is used for recommending a final set of VMs using the first set of VMs, the benchmarked metrics, the approximate function, set of VM recommendations.

3. The processor implemented method of claim 1, wherein the AI technique comprises one of a machine learning technique and a deep learning technique, where the machine learning technique includes a Gradient Boosting Machine, a Random Forest and a XGBoost and the deep learning technique includes a plurality of convolution layer, a plurality of recurrent layers, a plurality of feedforward layers, plurality of attention mechanisms.

4. The processor implemented method of claim 1, wherein the clustering technique comprises calculation of a plurality of cluster centers based on a ClusterGen function using the plurality of historic data, a parameter space, and the plurality of cloud infrastructure data.

5. The processor implemented method of claim 1, wherein the mapping technique includes defining a model space and identification of the set of models for the model space iteratively based on the pre-defined threshold accuracy parameter ($\epsilon$) and a model selection function.

6. The processor implemented method of claim 1, wherein the bayesian optimization technique includes defining a search space, iterating through the search space for a pre-defined number of trials using the approximation function and the cost function to generate the set of VM recommendations.

7. A system for recommending an optimal virtual machine (VM) instance, comprising:

a memory storing instructions;

one or more communication interfaces; and one or more hardware processors coupled to the memory via the one or more communication interfaces, wherein the one or more hardware processors are configured by the instructions to:

receive a plurality of inputs associated with an artificial intelligence (AI) technique, via one or more hardware processors, wherein the plurality of inputs comprises a training code (T), a plurality of dataset (D) of the training code, plurality of historic data, a plurality of cloud infrastructure data ($C_{data}$), a parameter space associated with the plurality of cloud infrastructure data ($C_{data}$), a user requirement, a pre-defined threshold accuracy parameter and a cost function, wherein the parameter space associated with the plurality of cloud infrastructure data comprising of hardware configurations regarding virtual machines (VM), comprising a memory, a central processing unit (CPU) clock speed, and number of graphics processing unit (GPUs), wherein the cost function includes a time parameter, a cost parameter and a carbon emission parameter;

generate a Virtual Machine (VM) knowledge store, via the one or more hardware processors, using the plurality of historic data based on a mathematical modelling technique;

identify a basic set of VMs for the training code (T) and the plurality of dataset (D), via the one or more hardware processors, using the VM knowledge store; and update, via the one or more hardware processors, the VM knowledge store for the training code (T) and the plurality of dataset (D) based on the basic set of VMs and the user requirement, wherein the updating of the VM knowledge store comprises:

identifying a first set of VMs for the training code (T) and the plurality of dataset (D), using the plurality of historic data, the parameter space and the plurality of cloud VM data based on a clustering technique;

benchmarking the training code (T) and the plurality of dataset (D) on the first set of VMs to obtain a benchmarked metrics using the plurality of inputs, based on a benchmarking technique;

mapping the benchmarked metrics and the parameter space to obtain an approximate function, based on the pre-defined threshold accuracy parameter using a mapping technique;

fine tuning a set of models until an error value is below a pre-defined threshold accuracy parameter ($\epsilon$);

including the set of models to a list of working models (Mm) when the error value of a model, among the set of models is below the pre-defined threshold accuracy parameter ($\epsilon$), wherein the list of working models is saved as a modelSelection function considering stacking, ensemble and blending approaches and creating an optimized approximation function with performance ($\Omega_{opt}$);

generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

8. The system of claim 7, wherein the one or more hardware processors are configured by the instructions to perform the recommending a final set of VMs based on the VM knowledge store using the first set of VMs, the benchmarked metrics, the approximate function, set of VM recommendation.

9. The system of claim 7, wherein the AI technique comprises one of a machine learning technique and a deep learning technique, where the machine learning technique includes a Gradient Boosting Machine, a Random Forest and a XGBoost and the deep learning technique includes a plurality of convolution layer, a plurality of recurrent layers, a plurality of feedforward layers, plurality of attention mechanisms.

10. The system of claim 7, wherein the one or more hardware processors are configured by the instructions to perform the clustering technique comprises calculation of a plurality of cluster centers based on a ClusterGen function using the plurality of historic data, a parameter space, and the plurality of cloud infrastructure data.

11. The system of claim 7, wherein the one or more hardware processors are configured by the instructions to perform the mapping technique includes defining a model space and identification of the set of models for the model space iteratively based on the pre-defined threshold accuracy parameter ($\epsilon$) and a model selection function.

12. The system of claim 7, wherein the one or more hardware processors are configured by the instructions to perform the bayesian optimization technique includes defining a search space, iterating through the search space for a pre-defined number of trials using the approximation function and the cost function to generate the set of VM recommendations.

13. One or more non-transitory machine-readable information storage mediums comprising one or more instructions which when executed by one or more hardware processors cause:

receive a plurality of inputs associated with an artificial intelligence (AI) technique, wherein the plurality of inputs comprises a training code (T), a plurality of dataset (D) of the training code, plurality of historic data, a plurality of cloud infrastructure data ($C_{data}$), a parameter space associated with the plurality of cloud infrastructure data ($C_{data}$), a user requirement, a pre-defined threshold accuracy parameter and a cost function, wherein the parameter space associated with the plurality of cloud infrastructure data comprising of hardware configurations regarding virtual machines (VM), comprising a memory, a central processing unit (CPU) clock speed, and number of graphics processing unit (GPUs), wherein the cost function includes a time parameter, a cost parameter and a carbon emission parameter;

generate a Virtual Machine (VM) knowledge store, using the plurality of historic data based on a mathematical modelling technique;

identify a basic set of VMs for the training code (T) and the plurality of dataset (D), using the VM knowledge store; and update, the VM knowledge store for the training code (T) and the plurality of dataset (D) based on the basic set of VMs and the user requirement, wherein the updating of the VM knowledge store comprises:

identifying a first set of VMs for the training code (T) and the plurality of dataset (D), using the plurality of historic data, the parameter space and the plurality of cloud VM data based on a clustering technique;

benchmarking the training code (T) and the plurality of dataset (D) on the first set of VMs to obtain a benchmarked metrics using the plurality of inputs, based on a benchmarking technique;

mapping the benchmarked metrics and the parameter space to obtain an approximate function, based on the pre-defined threshold accuracy parameter using a mapping technique;

fine tuning a set of models until an error value is below a pre-defined threshold accuracy parameter ($\epsilon$);

including the set of models to a list of working models ($M_\omega$) when the error value of a model, among the set of models is below the pre-defined threshold accuracy parameter ($\epsilon$), wherein the list of working models is saved as a modelSelection function considering stacking, ensemble and blending approaches and creating an optimized approximation function with performance ($\Omega_{opt}$);

generating a set of VM recommendations, using the approximate function, the cost function, the plurality of cloud infrastructure data, the training code (T) and the plurality of dataset (D) based on a bayesian optimization technique; and updating the VM knowledge store, using the first set of VMs, the benchmarked metrics, the approximate function, the set of VM recommendations.

* * * * *